United States Patent [19]
Doi et al.

[11] Patent Number: 5,396,161
[45] Date of Patent: Mar. 7, 1995

[54] TEMPERATURE COMPENSATOR CIRCUIT FOR AN INDUCTION MOTOR

[75] Inventors: Kazuhiko Doi, Tokyo; Masayuki Mori, Tsushima, both of Japan

[73] Assignee: Otis Elevator Company, Farmington, Conn.

[21] Appl. No.: 949,602

[22] Filed: Sep. 23, 1992

[30] Foreign Application Priority Data

Sep. 24, 1991 [JP] Japan ................. 3-242280

[51] Int. Cl.$^6$ ............................................. H02P 1/26
[52] U.S. Cl. .................................... 318/807; 318/818; 318/827; 318/471
[58] Field of Search ............... 318/473, 798, 800, 806, 318/828, 807, 254, 808, 818, 827, 471–472; 361/24, 25; 324/144

[56] References Cited

U.S. PATENT DOCUMENTS

| | | | |
|---|---|---|---|
| 4,677,360 | 6/1987 | Garces | 318/803 |
| 4,677,361 | 6/1987 | Yonemoto | 318/805 |
| 4,715,043 | 12/1987 | Chikasue | 324/144 |
| 4,780,658 | 10/1988 | Koyama | 318/805 |
| 4,885,519 | 12/1989 | Vogelmann | 318/800 |
| 4,939,437 | 7/1990 | Farag et al. | 318/473 |
| 5,003,243 | 3/1991 | Tadakuma et al. | 318/808 |
| 5,076,399 | 12/1991 | Horbruegger et al. | 187/116 |
| 5,136,228 | 8/1992 | Yamada et al. | 318/808 |
| 5,160,878 | 11/1992 | Nagano | 318/800 |
| 5,231,339 | 7/1993 | Kishimoto et al. | 318/807 |

FOREIGN PATENT DOCUMENTS 2262889 10/1990 Japan .
3135388 6/1991 Japan .

Primary Examiner—William M. Shoop, Jr.
Assistant Examiner—John W. Cabeca

[57] ABSTRACT

The purpose of this invention is to provide secondary resistance low temperature compensation in vector speed control at values that are close to the actual secondary time constant even at startup of the motor wherein the secondary time constant operation is not carried out.

The invention consists of vector speed control devices 1 to 5 of the induction motor IM, with secondary resistance low temperature compensation of the electric motor being carried out by installing a secondary time constant operator (6) which detects the secondary time constant of an electric motor; a comparator/register (7) which holds and outputs low temperature data $\tau_2$ from a comparison of register data and the output $\tau_2$ of the aforementioned operator (6); and a damping unit (8) which, during operation, carries out replacement of sequential data with the output $\tau_2$ of the operator (6), and, during shutdown, which turns to the output values $\tau_{2L}$ of the comparator/register unit (7), is caused to hold the damping characteristics, and which outputs this data to a slip angular frequency operator (5) of the vector control circuit, and by output from the damping unit (8) a value that is close to the actual secondary time constant at the time of startup, and thereupon, output the sequential data $\tau_2$.

4 Claims, 2 Drawing Sheets

TEMPERATURE COMPENSATOR CIRCUIT FOR AN INDUCTION MOTOR

TECHNICAL FIELD

This invention concerns a temperature compensation circuit method for induction motors characterized by the fact that it performs temperature compensation for the secondary resistance of the motor when vector control is performed in the velocity control device of a motor.

BACKGROUND OF THE INVENTION

There are the following conventional temperature compensation methods for the secondary resistance of an induction motor: (1) a method in which the variation in the secondary resistance is derived from the variation of the actual output voltage from the target voltage, and this variation is input into the slip angular frequency calculator for compensation (such as Japanese Patent Application No. Hei 1[1989]-267706); (2) a method in which the variation in the secondary resistance is derived from the secondary magnetic flux and the primary current, and this variation is an input of the slip angular frequency calculator for compensation (such as Japanese Patent Application No. Hei 1[1989]-82787); and (3) a method in which the secondary time constant of the motor is calculated from the transient characteristics of the output current or voltage as a DC voltage or current is applied, and the result is input to the slip angular frequency operator for compensation.

However, for said method (1) which detects the output voltage to make the temperature compensation, since compensation is performed when there is a certain change in the output voltage, the compensation has to be performed when the output voltage is high enough (that is, the output frequency is high enough), and so the compensation cannot be performed in the starting state.

For said method (2) which performs temperature compensation by the secondary magnetic flux and the primary current, since detection of the secondary magnetic flux is difficult, and the secondary magnetic flux is calculated; in this case, as the secondary magnetic flux is calculated from the output voltage, the compensation is performed by a certain variation in the output voltage, so the compensation cannot be performed in the start state.

For an elevator motor, however, the control should be performed over the entire region from start to stop, and the compensation has to be performed in the start stage; hence, said methods (1), (2) cannot be used for the temperature compensation of elevators.

On the other hand, for said method (3) which by measuring an output voltage, or the transition characteristics of the output voltage, by applying a direct current, the measurement time is long for a motor with a long time constant. For an elevator, the time from the stopping of the doors to the start of motion of the cage becomes longer, and the passengers feel uncomfortable.

The purpose of this invention is to solve the problems of the conventional methods by temperature compensation of the secondary resistance with a value near the actual secondary time constant, even in the start state, without calculating the secondary time constant.

SUMMARY OF THE INVENTION

This invention provides a temperature compensation circuit for the secondary resistance of an induction motor velocity control device by vector control including a secondary time constant calculator which detects the secondary time constant of the motor; a comparator and register unit (hereinafter referred to sometimes as a comparator/register unit) which compares the output of the secondary time constant calculator with the data registered therein, and which registers the data derived at the lowest temperature and outputs it at the same time; and a damping (or attenuating) unit which sends to a slip angular frequency calculator of the vector control circuit unit, when the motor is operating, successive values of replacement of data output from the secondary time constant calculator, and when the motor is stopped, a datum with a damping characteristic to cause it to approximate the output value of the comparator/register unit.

For the comparator/register unit, even when the output of the secondary time constant calculator is a higher temperature datum than the registered datum, if it is the initial detected datum, in the initial operation after the stop state had continued for a prescribed time, it is still used to replace the registered datum.

The comparator/register unit may alternatively be made of a data register unit which holds the initial output of the secondary time constant calculator in the initial operation after the stop state has continued for a prescribed time.

The damping unit may be replaced by a switch unit which provides the final output of the secondary time constant calculator just before stop during a period when the stop mode is continued for a prescribed time period, and which then switches to provide the output of the comparator/register unit to the slip angular frequency calculator.

The comparator/register unit holds the lower-temperature secondary time constant data when it receives the output from the secondary time constant calculator, it compares the output with the currently registered data; if the output is a datum at an even lower temperature, this datum is registered and is output at the same time.

The damping unit attenuates the datum with a damping characteristic, to cause it to approach the datum at the lower temperature from the comparator/register unit so that the data varies similarly to the variation in the secondary time constant after stopping (while the motor is cooling). As the data are output to the slip frequency calculator, the temperature compensation can be performed at a value near the actual secondary time constant when the operation is just started and the actual secondary time constant cannot be calculated.

During the operation period, with the output from the damping unit taken as the initial value, calculation of the secondary time constant is performed. The output of the calculation is used by the damping unit to successively replace the original data and the output is sent to the slip angular frequency calculator. Consequently, the temperature compensation can be performed in the period from start to stop, and the torque control performance can be improved from start to stop.

BEST MODE FOR CARRYING OUT THE INVENTION

Figure 1:
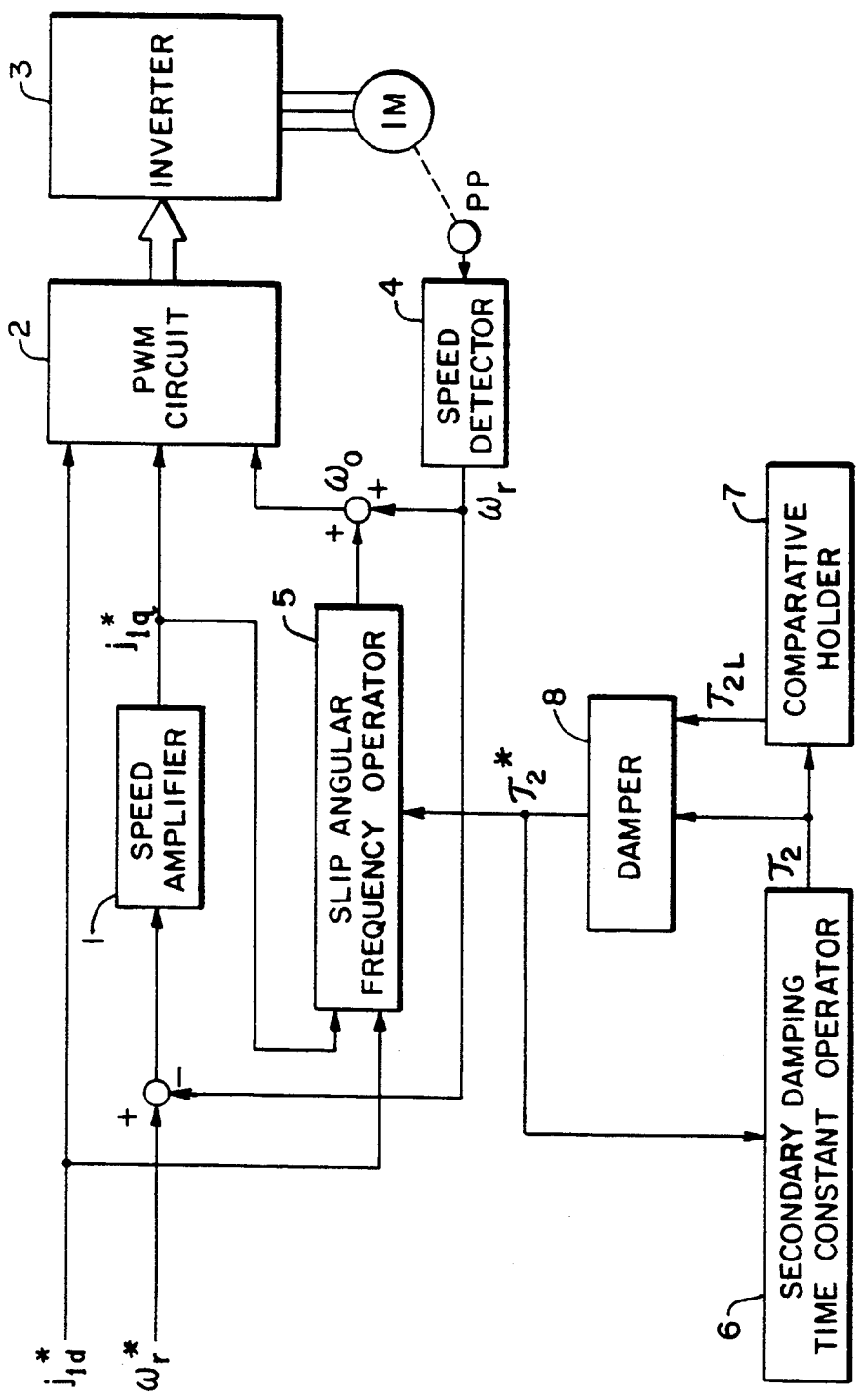
FIG. 1 is a block circuit diagram illustrating an application example of this invention.

In FIG. 1, a velocity amplifier 1 has the difference between rotor angular velocity command $\omega r^*$, and rotor angular velocity $\omega r$ as inputs, and has primary current instruction $i_{1q}^*$ (of q-axis in the orthogonal 2-axis d-q coordinate system as the output; represents a PWM circuit 2 which controls an inverter 3 with inputs of d-axis primary current instruction $i_{1d}^*$, q-axis primary current instruction $i_{1q}^*$, and power source angular velocity $\omega_0$ (=velocity $\omega r$+slip angular frequency $\omega s$); a velocity detecting unit 4 detects, via pickup PP, the velocity $\omega r$ of an induction motor IM driven by the inverter 3; and a slip angular frequency generator 5 has q-axis primary current instruction $i_{1q}^*$, rotor angular velocity instruction $\omega r^*$ and secondary time constant $\tau_2$ as the inputs, and has slip angular frequency $\omega s$ as the output (conventional technique).

A secondary time constant calculator circuit 6 detects the secondary time constant $\tau_2$ of the motor from the transient characteristics with output $\tau_2^*$ the initial value the input to a comparator/register unit 7 is the output datum $\tau_2$ of secondary time constant calculator circuit 6, which compares it with the registered low-temperature secondary time constant $\tau_{2L}$, and sets the input datum $\tau_{2L}$ if the input datum $\tau_2$ relates to lower temperature as compared with the registered low-temperature secondary time constant $\tau_{2L}$ (that is, when the time constant is even longer).

A damping unit 8 has $\tau_2$ and $\tau_{2L}$ as its inputs, outputs $\tau_2^*$ to slip angular frequency calculator 5 each time $\tau_2$ varies during the inverter operation. During the stopping period of the inverter, the damping unit 8 outputs datum $\tau_2^*$ with damping characteristics to reach registered datum $\tau_{2L}$ from the value that datum $\tau_2$ had just before stopping. This is in contrast with the conventional scheme, in which there is no comparator/register unit and no damping unit, and the output of the secondary time constant circuit is sent to the slip angular frequency calculator for performing the temperature compensation.

Figure 2:
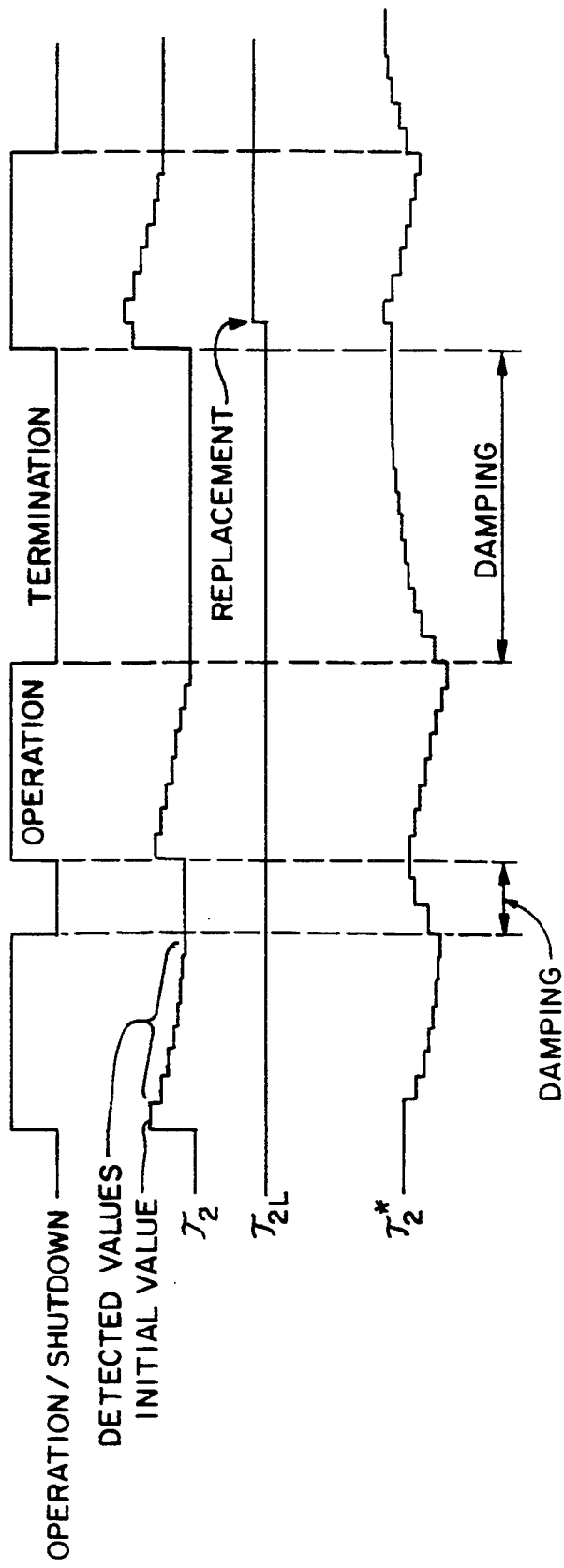
FIG. 2 is a diagram illustrating the relation between the data of the various parts of the temperature compensation circuit both while the motor is operating and while the motor is stopped.

FIG. 2 shows the relation among $\tau_2$, $\tau_{2L}$, and $\tau_2^*$.

With the aforementioned configuration, damping unit 8 is taken as a switch unit. In the stop mode, when the stop state is continued for a prescribed time, the output $\tau_2$ just before stop; after the stop is held has continued for a prescribed time, switching is made to $\tau_{2L}$. In this simple way, the start characteristics can be improved. In another scheme, instead of the low-temperature datum, the data replacement condition for comparator/register unit 7 is taken as the initial output of the secondary time constant calculator 6 of the initial operation after the stop state has continued for a prescribed time. In this way, it is possible to follow the variation in the atmospheric temperature.

In the aforementioned example, the condition for replacement of the datum registered in the comparing and holding unit 7 is that the replacement value be at the lower temperature. However, since it is acceptable to hold the datum of the atmospheric temperature, it is also possible that even when the output of the secondary time constant calculator relates to a temperature higher than that of the registered datum, as long as it is the initial calculated datum of the initial operation after the stop state has continued for a prescribed time, it may be used for replacing the registered datum. Also, instead of the comparator/register unit, it is possible to use a data register unit which can hold the initial secondary time constant operator output of the initial operation after the stop state has continued for a prescribed time.

In the aforementioned application example, damping unit 8 can form the secondary time constant datum in the start mode by damping the registered datum. However, in the case when the stop time is long, the secondary time constant in the start mode approaches the registered datum. Consequently, the damping unit may be replaced by a switch unit which can hold the last output of the secondary time constant operator right before stopping as the stop mode continues for a prescribed period of time, and which selects the output of the comparator/register unit (or the data register unit) to be the output datum $\tau_2^*$ after the stop state has continued for a prescribed period of time.

With the aforementioned configuration, this invention has the following effects.

(1) Since it can store the secondary time constant at the actual low temperature, and has damping characteristics for it during the stop mode, even in the start stage when the calculation of the actual secondary time constant cannot be performed, the temperature compensation can still be made at a value similar to the actual secondary time constant. Consequently, the torque control characteristics can be improved in the entire period from start to stop.

(2) In the case when the data replacement condition for the comparator/register unit is set so that the initial secondary time constant datum detected after the stop state has continued for a prescribed time is used for replacement, the registered datum varies following the variation in the atmospheric (environmental) temperature. Consequently, it is possible to select the secondary time constant for start corresponding to the atmospheric temperature.

(3) It is possible to perform temperature compensation for practical application without problems even when the secondary time constant measurement period is before release of the brake. Consequently, it is possible to perform the measurement of the secondary time constant during the running process, and the running control can be performed without a long start time.

We claim:

1. An electric motor secondary resistance temperature compensation circuit for an electric motor speed control device employing vector control, comprising:
a secondary time constant calculator that calculates the secondary time constant of the electric motor;
a comparator and register unit for registering a secondary time constant value and responsive to the output of said calculator for comparing the registered secondary time constant value with the output value of said secondary time constant calculator, and for registering and outputting the one of said time constant values that corresponds to a lower temperature;
a slip angular frequency calculator; and
a damping unit which, during motor operation, performs successive replacement of sequential data with the output of the secondary time constant calculator, and which, during motor shutdown, attenuates the output value of the comparator/register unit and outputs this data to said slip angular frequency calculator.

2. An electric motor secondary resistance temperature compensation circuit for an electric motor speed control device employing vector control, comprising:
   a secondary time constant calculator which detects the secondary time constant of the motor;
   a comparator and register unit for registering a secondary time constant value and responsive to the output of said calculator for comparing the registered secondary time constant value with the output value of said secondary time constant calculator, and for registering; and outputting the one of said time constant values that corresponds to a lower temperature;
   a slip angular frequency calculator; and
   a switch unit which holds a final output value of the secondary time constant calculator right before stopping the motor, during a period when the stop state is continued for a prescribed time period, and which switches said final output value to the output of the comparator/register unit after the stop state has been continued for a prescribed time.

3. An electric motor secondary resistance temperature compensation circuit for an electric motor speed control device employing vector control, comprising:
   a secondary time constant calculator that calculates the secondary time constant of the electric motor;
   a comparator and register unit for registering a secondary time constant value and responsive to the output of said calculator for comparing the registered secondary time constant value with the output value of, said secondary time constant calculator, and for registering and outputting the one of said time constant values that corresponds to a lower temperature; characterized by the fact that, even when the output of said secondary time constant calculator is a higher-temperature value than said registered time constant value, if it is an initial calculated value in the initial operation after a motor stop state continues for a prescribed time, it is still taken as the value used to replace the registered value;
   a slip angular frequency calculator; and
   a damping unit which, during motor operation, performs successive replacement of sequential data with the output of the secondary time constant calculator, and which, during said motor stop state, attenuates the output value of the comparator and register unit and outputs this data to said slip angular frequency calculator.

4. An electric motor secondary resistance temperature compensation circuit for an electric motor speed control device employing vector control, comprising:
   a secondary time constant calculator which calculates the secondary time constant of the motor;
   a comparator and register unit for registering a secondary time constant value and responsive to the output of said calculator for comparing the registered secondary time constant value with the output of the secondary time constant calculator, and for registering and outputting the one of said time constant values that corresponds to a lower temperature; characterized by the fact that, even when the output of the secondary time constant operator is a higher-temperature value than said registered time constant value, if it is an initial calculated value in the initial operation after a motor stop state continues for a prescribed time, it is still taken as the value used to replace the registered value;
   a slip angular frequency calculator; and
   a switch unit which holds the final output of the secondary time constant calculator right before stopping the motor, during a period when the stop state is continued for a prescribed time period, and which switches said final output value to the output of the comparator/register unit after the stop state has been continued for a prescribed time.

* * * * *